United States Patent
Li et al.

(10) Patent No.: US 8,749,216 B2
(45) Date of Patent: Jun. 10, 2014

(54) CONSTANT ON-TIME CONVERTER WITH STABILIZING OPERATION AND METHOD THEREOF

(75) Inventors: Xiaoming Li, Hangzhou (CN); Xiaokang Wu, Hangzhou (CN); Qian Ouyang, Hangzhou (CN)

(73) Assignee: Chengdu Monolithic Power Systems Co., Ltd., Chengdu (CN)

(*) Notice: Subject to any disclaimer, the term of this patent is extended or adjusted under 35 U.S.C. 154(b) by 156 days.

(21) Appl. No.: 13/324,504

(22) Filed: Dec. 13, 2011

(65) Prior Publication Data

US 2012/0146606 A1    Jun. 14, 2012

(30) Foreign Application Priority Data

Dec. 13, 2010    (CN) .......................... 2010 1 0601558

(51) Int. Cl.
*H02M 3/157*    (2006.01)

(52) U.S. Cl.
USPC .......................................... 323/283; 323/288

(58) Field of Classification Search
USPC .......................... 323/282, 284, 285, 288, 283
See application file for complete search history.

(56) References Cited

U.S. PATENT DOCUMENTS

| 8,471,543 B2* | 6/2013 | Nakazono ...................... 323/283 |
| 2006/0202669 A1* | 9/2006 | Nishimori ...................... 323/283 |
| 2007/0120547 A1* | 5/2007 | Tateishi et al. ................ 323/282 |
| 2007/0182391 A1* | 8/2007 | Chapuis et al. ............... 323/282 |
| 2007/0222423 A1* | 9/2007 | Chen et al. .................... 323/283 |
| 2010/0134080 A1 | 6/2010 | Ouyang |
| 2010/0181983 A1 | 7/2010 | Ouyang |

* cited by examiner

*Primary Examiner* — Gary L Laxton
(74) *Attorney, Agent, or Firm* — Perkins Coie LLP

(57) ABSTRACT

A constant on-time converter has an input terminal, an output terminal, a feedback circuit, an operating circuit, a comparison circuit, a timer, a driving circuit and a switching circuit. The operating circuit is coupled to a compensation signal adjusted by a digital controller, and the compensation signal rises up to a predetermined amplitude when a feedback signal is less than a reference signal.

18 Claims, 8 Drawing Sheets

CONSTANT ON-TIME CONVERTER WITH STABILIZING OPERATION AND METHOD THEREOF

CROSS-REFERENCE TO RELATED APPLICATION(S)

This application claims the benefit of CN application No. 201010601558.7, filed on Dec. 13, 2010, and incorporated herein by reference.

TECHNICAL FIELD

This invention relates generally to electrical circuits, and more particularly but not exclusively to constant on-time converter.

BACKGROUND

Constant on-time DC/DC converters are widely used in power conversion due to their excellent load transient response, high efficiency, simple configuration and small size. One example is the application in consumer electronics such as notebook, netbook, computer, and personal digital assistant ("PDA").

FIG. 1 schematically illustrates a traditional DC/DC converter. For constant on-time control, when output voltage of the converter is lower than a reference voltage, the converter is configured to provide power from input terminal to output terminal. As one example shown in FIG. 1, when output voltage is less than a reference voltage, a high-side switch S1 is turned on and a low-side switch S2 is turned off, then a current is supplied from input terminal VIN to output terminal VO. Output voltage is obtained at output terminal VO through an output filter comprising an inductor L and an output capacitor C. Output capacitor C comprises an ideal capacitor CO and an equivalent series resistance ("ESR").

FIG. 2 and FIG. 3 show waveforms illustrating signals of the converter shown in FIG. 1. The first waveform shows a driving signal 201/301 of high-side switch S1. The second waveform shows a voltage ripple 202/302 across the ESR of output capacitor C. The third waveform shows a voltage ripple 203/303 across the ideal capacitor CO of output capacitor C. And the last waveform shows an output voltage ripple 204/304. FIG. 2 shows waveforms when the resistance value of the ESR is relatively small. Voltage ripple 202 across the ESR is in phase with driving signal 201. The ideal capacitor CO has an integral effect and voltage ripple 203 across the ideal capacitor CO is 90 degree delayed to driving signal 201. Since the resistance value of the ESR is relatively small, voltage ripple 203 across the ideal capacitor CO plays a dominant role, and output voltage ripple 204 is determined by the ideal capacitor CO. Thereby output voltage ripple 204 is delayed to driving signal 201, and the system may be unstable as shown in FIG. 2. When the resistance value of the ESR is relatively large, voltage ripple 302 across the ESR plays a dominant role. As shown in FIG. 3, output voltage ripple 304 is about in phase with driving signal 301, and the system is stable. In summary, an equivalent series resistance with large resistance value is needed in the traditional constant on-time converter to stabilize the system.

Accordingly, a constant on-time converter with good stability is needed, especially when output capacitor with low ESR is used, e.g., ceramic capacitor.

SUMMARY

The embodiments of the present disclosure disclose a constant on-time converter with stabilizing operation and a control method thereof. The converter may comprise an input terminal, an output terminal, a feedback circuit, an operating circuit, a comparison circuit, a timer, a driving circuit and a switching circuit. The operating circuit may be coupled to a compensation signal adjusted by a digital controller.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Several embodiments of the present invention are described below with reference to constant on-time converter and associated method of operation. As used hereinafter, the term "couple" generally refers to multiple ways including a direct connection with an electrical conductor and an indirect connection through intermediate diodes, resistors, capacitors, and/or other intermediaries. The term "switch" may mean a semiconductor device having "ON" and "OFF" states. The term "digital signal" generally represents a sequence of discrete values with arbitrary bit stream, e.g., 8-bits. The term "basic reference signal" generally indicates expected output voltage level. The term "reference signal" generally represents a reference level compared to a feedback signal. The "maximum sampling frequency" is a measurement of a maximum speed at which the digital-to-analog converters ("DACs") can operate and can still produce a correct output.

Figure 1:
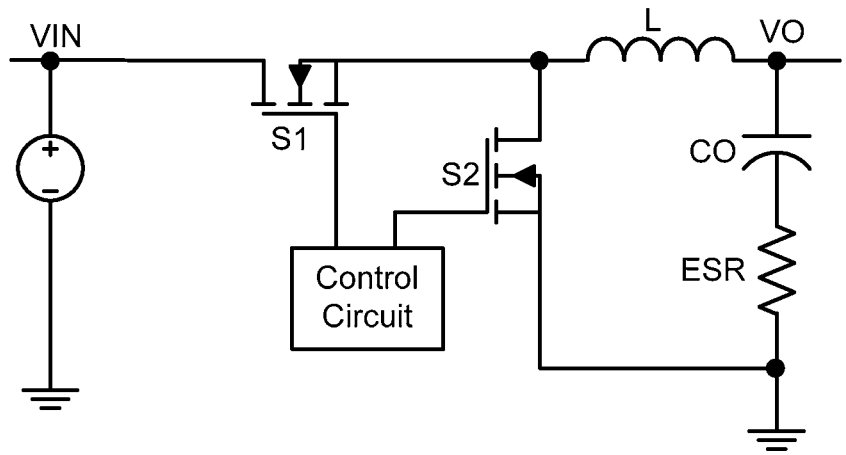
FIG. 1 schematically illustrates a traditional DC/DC converter.
Figure 2:
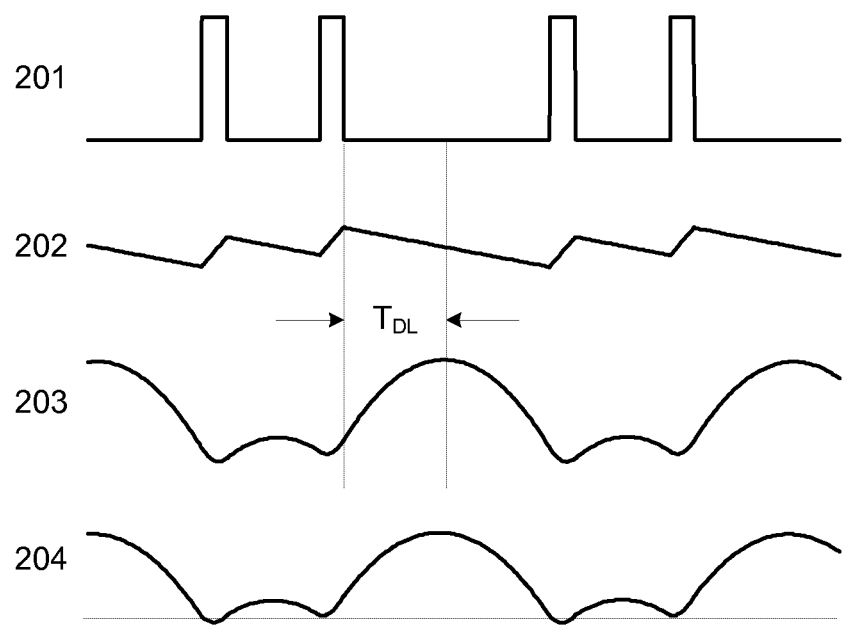
FIG. 2 shows waveforms illustrating signals of the converter shown in FIG. 1 when the resistance value of the equivalent series resistance of the output capacitor is relatively small.
Figure 3:
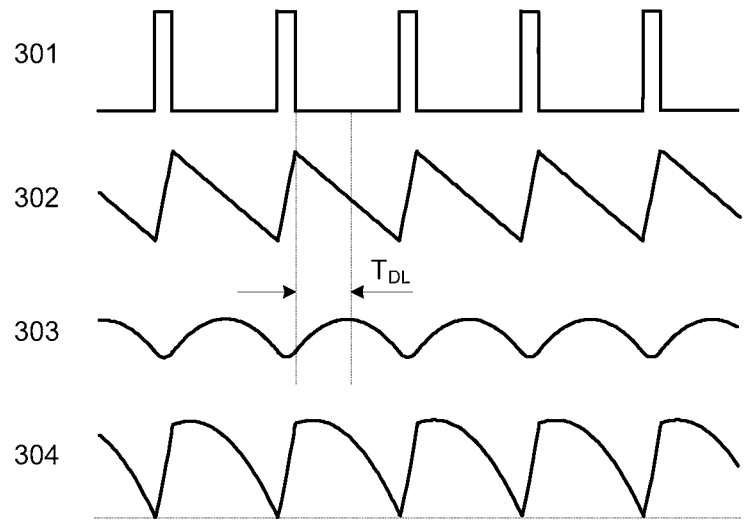
FIG. 3 shows waveforms illustrating signals of the converter shown in FIG. 1 when the resistance value of the equivalent series resistance of the output capacitor is relatively large.
Figure 4:
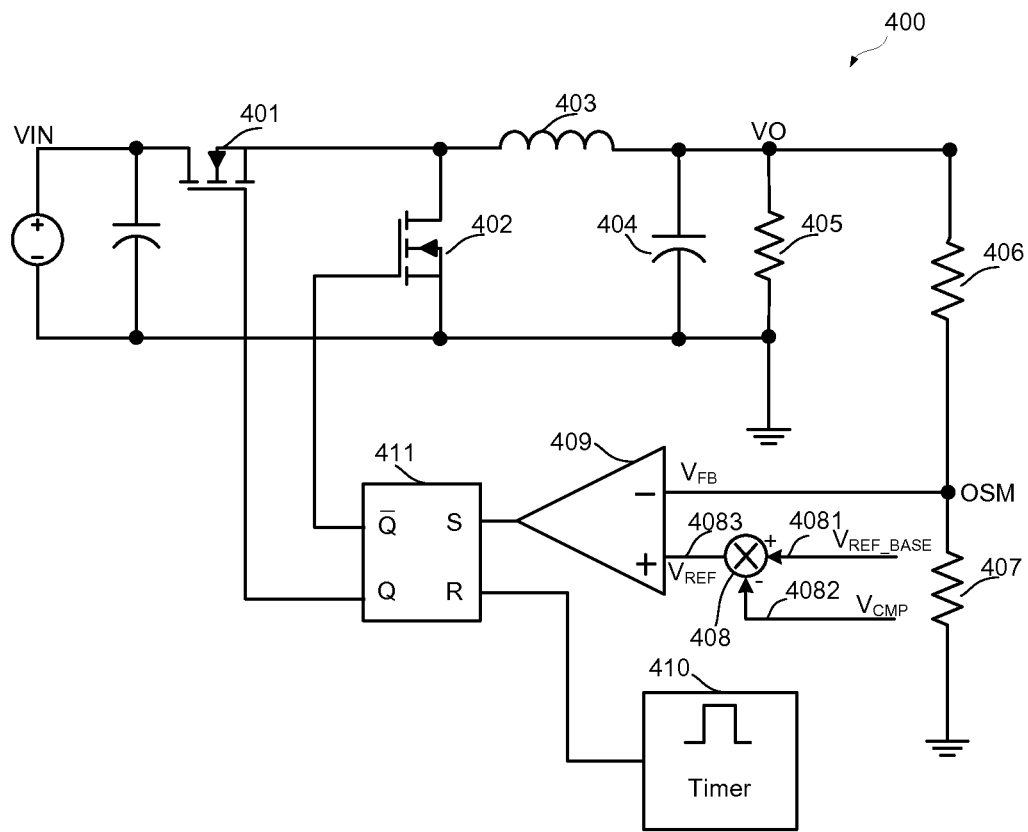
FIG. 4 schematically illustrates a constant on-time DC/DC converter in accordance with an embodiment of the present invention.

FIG. 4 schematically illustrates a constant on-time converter 400 in accordance with an embodiment of the present invention. Even though only certain components are shown in FIG. 4, in other embodiments, converter 400 can further include switches, diodes, transistors, and/or other suitable components in addition to or in lieu of the components shown in FIG. 4. Though only step-down topology is shown in FIG. 4, one of ordinary skill in the art will appreciate that other topologies may also be used without detracting from the merits of the present invention.

As shown in FIG. 4, converter 400 comprises an input terminal VIN, an output terminal VO, a feedback circuit, an operating circuit 408, a comparison circuit 409, a timer 410, a driving circuit 411, and a switching circuit comprising a high-side switch 401 and a low-side switch 402. Converter 400 further comprises an output filter comprising an inductor 403 and an output capacitor 404. Load 405 is connected to output terminal VO.

Input terminal VIN is coupled to an input voltage $V_{IN}$ and output terminal VO is configured to provide an output voltage $V_O$. The switching circuit is coupled to input terminal VIN and is configured to regulate output voltage $V_O$. The feedback circuit is configured to feed back output voltage $V_O$ and provide a sensed output voltage $V_{OSM}$. Sensed output voltage $V_{OSM}$ is configured to generate a feedback signal $V_{FB}$. In one embodiment, the feedback circuit comprises a resistor divider comprising a resistor 406 and a resistor 407, sensed output voltage $V_{OSM}$ is provided at common node OSM of resistor 406 and resistor 407. Sensed output voltage $V_{OSM}$ is proportional to output voltage $V_O$, and may be generated by other methods, such as generated by directly connecting to output terminal VO or generated by remote sense circuitry.

Operating circuit 408 comprises a first input 4081, a second input 4082, and an output 4083. Input 4081 is coupled to a basic reference signal $V_{REF\_BASE}$, input 4082 is coupled to a compensation signal $V_{CMP}$, and output 4083 is coupled to comparison circuit 409. Compensation signal $V_{CMP}$ is configured to be adjusted by a digital controller. In one embodiment, output 4083 of operating circuit 408 comprises a reference signal $V_{REF}$. Operating circuit 408 is configured to provide the reference signal $V_{REF}$ by subtracting compensation signal $V_{CMP}$ from basic reference signal $V_{REF\_BASE}$. Basic reference signal $V_{REF\_BASE}$ indicates an expected output level, e.g., an expected $V_O$ is about 1.2V. Basic reference signal $V_{REF\_BASE}$ may be adjusted by the digital controller.

One of ordinary skill in the art will appreciate that either digital circuits or analog circuits may be employed to implement operating circuit 408 without detracting from the merits of the present invention. In one embodiment, a digital reference signal $V_{REF\ (D)}$ is provided by subtracting a digital compensation signal $V_{CMP\ (D)}$ from a digital basic reference signal $V_{REF\_BASE\ (D)}$. The digital reference signal $V_{REF\ (D)}$ can be converted to reference signal $V_{REF}$ through a digital-to-analog converter ("DAC"). The digital controller may also comprise other functions to improve performance of converter 400, e.g., algorithms to improve precise of output voltage $V_O$, algorithms to improve line or load regulation or algorithms to improve transient response performance.

Comparison circuit 409 is configured to compare feedback signal $V_{FB}$ with reference signal $V_{REF}$ and is configured to provide a comparison signal accordingly. Feedback signal $V_{FB}$ is coupled to an inverting terminal of comparison circuit 409, and reference signal $V_{REF}$ is coupled to a non-inverting terminal of comparison circuit 409. When feedback signal $V_{FB}$ is less than reference signal $V_{REF}$, comparison circuit 409 is configured to output an active comparison signal, e.g., logic HIGH. Otherwise, comparison circuit 409 is configured to output an inactive comparison signal, e.g., logic LOW. In one embodiment, sensed output voltage $V_{OSM}$ is served as feedback signal $V_{FB}$ and is coupled to the inverting terminal of comparison circuit 409. Timer 410 is configured to provide an on-time signal. Driving circuit 411 is coupled to comparison circuit 409 and timer 410. The comparison signal outputted by comparison circuit 409 is coupled to a set terminal of driving circuit 411. The on-time signal outputted by timer 410 is coupled to a reset terminal of driving circuit 411. Driving circuit 411 is configured to generate driving signals for high-side switch 401 and low-side switch 402. As shown in FIG. 4, when feedback signal $V_{FB}$ is less than reference signal $V_{REF}$, i.e., when comparison signal is logic HIGH, driving signal of high-side switch 401 is set to HIGH. When an expected on-time expired, driving signal of high-side switch 401 is reset to LOW. In one embodiment, driving signal of low-side switch 402 is complementary with driving signal of high-side switch 401, i.e., when driving signal of high-side switch 401 is set to HIGH, driving signal of low-side switch 402 is set to LOW; when driving signal of high-side switch 401 is set to LOW, driving signal of low-side switch 402 is set to HIGH.

Switch 401 or switch 402 may be a metal oxide semiconductor field effect transistor ("MOSFET"). The MOSFET can be either N type or P type. Other types of switch such as bipolar junction transistor ("BJT") or junction field effect transistor ("JFET") can also be employed.

It is noted that the logics of "HIGH" or "LOW" for the logic signals may be in alternative levels since different logic levels may lead to a same result. For example, when feedback signal $V_{FB}$ is less than reference signal $V_{REF}$, high-side switch 401 is turned ON no matter the comparison signal or driving signal of high-side switch 401 is in logic HIGH or logic LOW.

Converter 400 may have multiple phases but only one phase is shown in FIG. 4 for simplicity and clarity.

Figure 5:
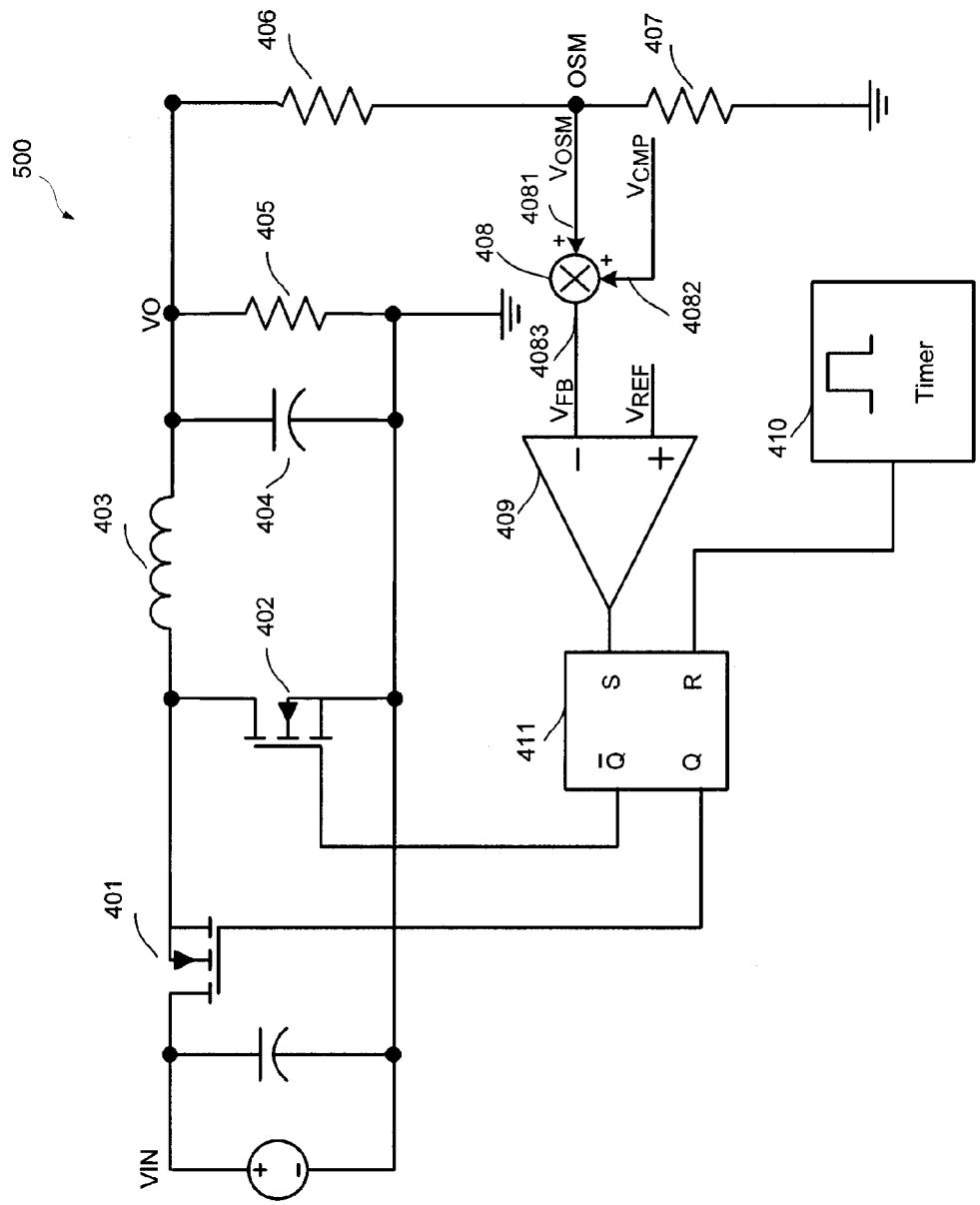
FIG. 5 schematically illustrates a constant on-time DC/DC converter in accordance with another embodiment of the present invention.

FIG. 5 schematically illustrates a constant on-time converter 500 in accordance with another embodiment of the present invention. Circuit 500 is almost the same as circuit 400 except feedback signal $V_{FB}$, reference signal $V_{REF}$ and operating circuit 408. Only feedback signal $V_{FB}$, reference signal $V_{REF}$ and operating circuit 408 are described below for simplicity and clarity.

As shown in FIG. 5, operating circuit 408 comprises a first input 4081, a second input 4082, and an output 4083. Input 4081 is coupled to sensed output signal $V_{OSM}$, input 4082 is coupled to a compensation signal $V_{CMP}$, and output 4083 is coupled to comparison circuit 409. In one embodiment, operating circuit 408 is coupled to the feedback circuit and output 4083 of operating circuit 408 comprises feedback signal $V_{FB}$. Operating circuit 408 is configured to provide feedback signal $V_{FB}$ by adding compensation signal $V_{CMP}$ to sensed output signal $V_{OSM}$. Compensation signal $V_{CMP}$ is adjusted by the digital controller. Sensed output voltage $V_{OSM}$ is proportional to output voltage $V_O$. In one embodiment, sensed output voltage $V_{OSM}$ is the voltage at common node OSM of resistor 406 and resistor 407. In another embodiment, sensed output voltage $V_{OSM}$ is coupled to output terminal VO directly, and the sensed output voltage $V_{OSM}$ equals the output voltage $V_O$.

In one embodiment, reference signal $V_{REF}$ is adjusted by the digital controller. The digital controller may also comprise other functions to improve performance of converter 500, e.g., algorithms to improve precise of output voltage $V_O$, algorithms to improve line or load regulation or algorithms to improve transient response performance.

Referring to FIG. 4 and FIG. 5, operating circuit 408 is coupled to compensation signal $V_{CMP}$ which is configured to be adjusted by the digital controller. Compensation signal $V_{CMP}$ is configured to achieve stabilizing operation for circuit 400 or circuit 500, especially when output capacitor with low ESR is used, e.g., ceramic capacitor.

Figure 6:
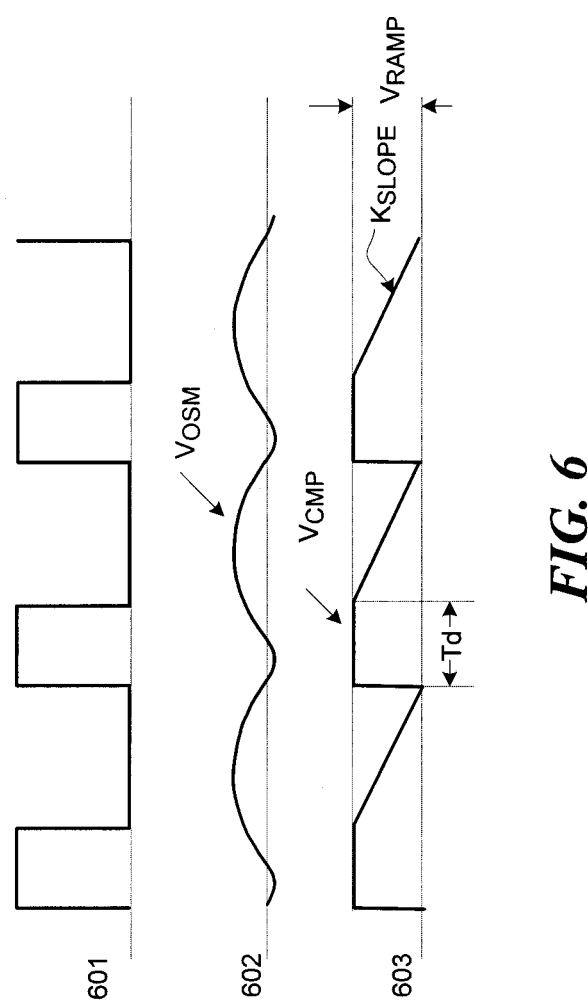
FIG. 6 shows waveforms illustrating signals of the circuit shown in FIG. 4 and FIG. 5 in accordance with embodiments of the present invention.

FIG. 6 shows waveforms illustrating signals of the circuit shown in FIG. 4 and FIG. 5 in accordance with embodiments of the present invention. The first waveform 601 is the driving signal of high-side switch 401. Waveform 601 only shows logic level for simplicity and clarity. High-side switch 401 is expected to be turned ON when its driving signal is logic HIGH, and high-side switch 401 is expected to be turned OFF when its driving signal is logic LOW. The second waveform 602 shows sensed output voltage $V_{OSM}$, and the third waveform 603 shows compensation signal $V_{CMP}$.

Compensation signal $V_{CMP}$ is configured to be adjusted by a digital controller. In one embodiment, compensation signal $V_{CMP}$ is subtracted from basic reference signal $V_{REF\_BASE}$ as reference signal $V_{REF}$, feedback signal $V_{FB}$ is sensed output voltage $V_{OSM}$, and then reference signal $V_{REF}$ is compared with feedback signal $V_{FB}$. In another embodiment, compensation signal $V_{CMP}$ is added to sensed output voltage $V_{OSM}$ as feedback signal $V_{FB}$, reference signal may be provided by external circuit or may be adjusted by the digital controller, and then feedback signal $V_{FB}$ is compared with reference signal $V_{REF}$.

Continuing with FIG. 6, when feedback signal $V_{FB}$ is less than reference signal $V_{REF}$, i.e., at the leading edge of waveform 601, compensation signal $V_{CMP}$ rises up to a voltage of predetermined amplitude signal $V_{RAMP}$ as waveform 603 shown. After a delay time period Td expired, compensation signal $V_{CMP}$ starts to decrease. Between the leading edge of waveform 601 and the leading edge of waveform 603, there may be a controlled delay besides an intrinsic logic delay. The controlled delay may be adjusted by the digital controller or by external circuits. Delay time period Td may be predetermined by the digital controller. In one embodiment, delay time period Td is the time period during which high-side switch 401 kept ON. After delay time period Td expired, compensation signal $V_{CMP}$ may ramp down at a falling rate $K_{SLOPE}$. Compensation signal $V_{CMP}$ may decrease at a non-linear falling rate. For example, about 10V/ms at first and then about 40V/ms.

In one embodiment, amplitude signal $V_{RAMP}$ and/or falling rate $K_{SLOPE}$ are adjusted by the digital controller. Compensation signal $V_{CMP}$ compensates a delayed phase caused by a capacitance of output capacitor 404, especially at the falling edge of compensation signal $V_{CMP}$. Thus, compensation signal $V_{CMP}$ is varied during every switching period as shown in FIG. 6 to ensure stabilizing operation.

Though only analog waveform 603 is shown in FIG. 6, it is noted to one of ordinary skill in the art that waveform 603 may also represent digital signal without detracting from the merits of the present inventions.

Figure 7:
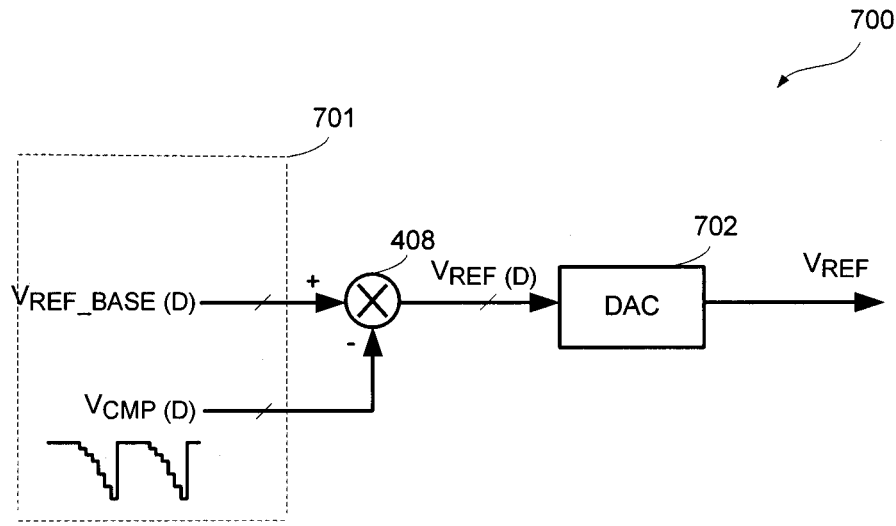
FIG. 7 schematically illustrates a diagram of circuit providing a reference signal shown in FIG. 4 in accordance with an embodiment of the present invention.

FIG. 7 schematically illustrates a diagram of circuit 700 providing a reference signal shown in FIG. 4 in accordance with an embodiment of the present invention. Circuit 700 comprises a digital controller 701, and provides a reference signal $V_{REF}$ to comparison circuit 409 as shown in FIG. 4. Reference signal $V_{REF}$ is configured to be adjusted by digital controller 701. Digital controller 701 provides a digital basic reference signal $V_{REF\_BASE\ (D)}$, and a digital compensation signal $V_{CMP\ (D)}$. Operating circuit 408 is configured to provide the digital reference signal $V_{REF\ (D)}$ by subtracting digital compensation signal $V_{CMP\ (D)}$ from digital basic reference signal $V_{REF\_BASE\ (D)}$. A digital-to-analog converter ("DAC") 702 is used to convert the digital reference signal $V_{REF\ (D)}$ to reference signal $V_{REF}$.

Continuing with FIG. 7, digital compensation signal $V_{CMP\ (D)}$ is varied during every switching period to ensure stabilizing operation, and digital reference signal $V_{REF\ (D)}$ is varied with digital compensation signal $V_{CMP\ (D)}$ during every switching period. As a result, a maximum sampling frequency of DAC 702 is related with the switching frequency of converter 400. The maximum sampling frequency of DAC 702 needs substantially higher than the switching frequency to ensure the correctness of compensation signal $V_{CMP}$. In one example, the switching frequency is about 500 kHz, and the maximum sampling frequency of DAC 702 is about 5 MHz.

Figure 8:
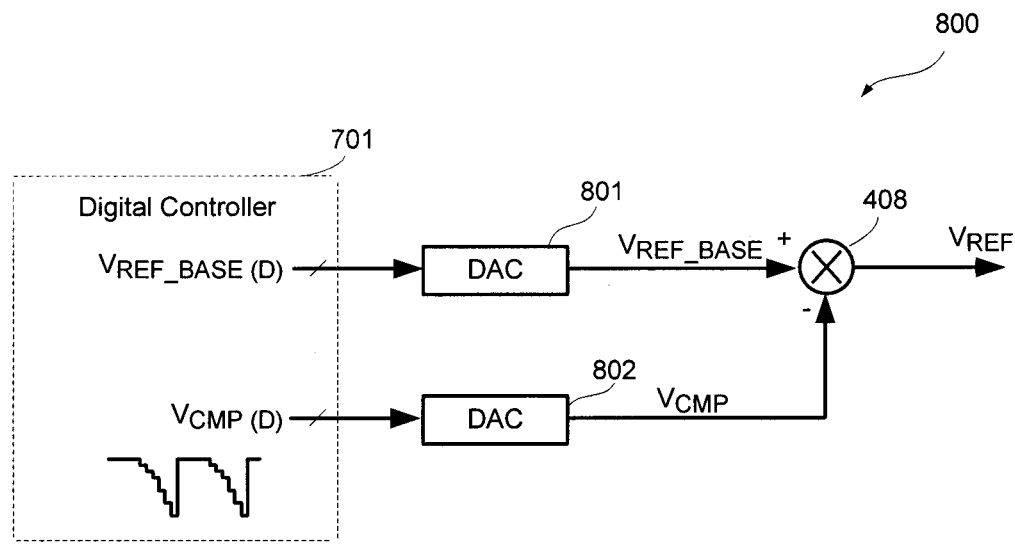
FIG. 8 schematically illustrates a diagram of circuit providing a reference signal shown in FIG. 4 in accordance with another embodiment of the present invention.

FIG. 8 schematically illustrates a diagram of circuit 800 providing a reference signal shown in FIG. 4 in accordance with another embodiment of the present invention. Circuit 800 comprises a digital controller 701, and provides a reference signal $V_{REF}$ to comparison circuit 409 as shown in FIG. 4. Digital controller 701 comprises a digital basic reference signal $V_{REF\_BASE\ (D)}$ and a digital compensation signal $V_{CMP\ (D)}$. A DAC 801 is used to convert digital basic reference signal $V_{REF\_BASE\ (D)}$ to a basic reference signal $V_{REF\_BASE}$. A DAC 802 is used to convert digital compensation signal $V_{CMP\ (D)}$ to compensation signal $V_{CMP}$. Operating circuit 408 receives compensation signal $V_{CMP}$ and basic reference signal $V_{REF\_BASE}$, and then provides reference signal $V_{REF}$. Operating circuit 408 generates reference signal $V_{REF}$ by subtracting compensation signal $V_{CMP}$ from basic reference signal $V_{REF\_BASE}$.

Continuing with FIG. 8, digital compensation signal $V_{CMP\ (D)}$ is varied during every switching period to ensure stabilizing operation. As a result, a maximum sampling frequency of DAC 802 needs substantially higher than the switching frequency of converter 400 to ensure the correctness of compensation signal $V_{CMP}$. In one example, the switching frequency is about 500 kHz, and the maximum sampling frequency of DAC 802 is about 5 MHz.

Figure 9:
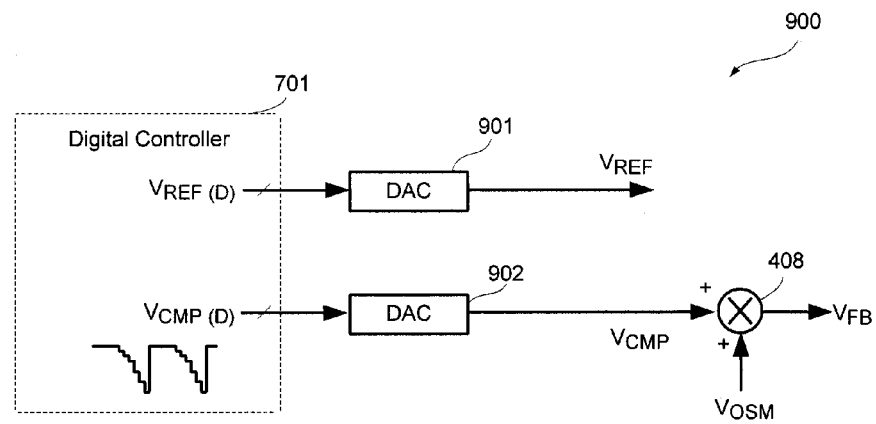
FIG. 9 schematically illustrates a diagram of circuit providing a feedback signal shown in FIG. 5 in accordance with an embodiment of the present invention.

FIG. 9 schematically illustrates a diagram of circuit 900 providing a feedback signal shown in FIG. 5 in accordance with an embodiment of the present invention. Circuit 900 comprises a digital controller 701, and provides a feedback signal $V_{FB}$ to comparison circuit 409 as shown in FIG. 5. Digital controller 701 comprises a digital compensation signal $V_{CMP\ (D)}$. A DAC 902 is used to convert digital compensation signal $V_{CMP\ (D)}$ to compensation signal $V_{CMP}$. A maximum sampling frequency of DAC 902 needs substantially higher than the switching frequency of converter 500. Feedback signal $V_{FB}$ is generated by adding compensation signal $V_{CMP}$ to sensed output signal $V_{OSM}$.

Continuing with FIG. 9, digital controller 701 may further comprise a digital reference signal $V_{REF\ (D)}$. A DAC 901 is used to convert digital reference signal $V_{REF\ (D)}$ to reference signal $V_{REF}$. Circuit 900 then provides reference signal $V_{REF}$ to comparison circuit 409 shown in FIG. 5.

Considering FIG. 7, FIG. 8, and FIG. 9, in order to achieve stabilizing operation, compensation signal $V_{CMP}$ is varied during each switching period as shown in FIG. 6. As a result, higher maximum sampling frequency DAC, e.g., 10 MHz, is needed when switching frequency becomes higher, e.g., 1 MHz switching frequency. However, the cost is increased rapidly with higher maximum sampling frequency of DAC. The following embodiments address this issue by employing a charging circuit and a capacitor to provide compensation signal $V_{CMP}$.

Figure 10:
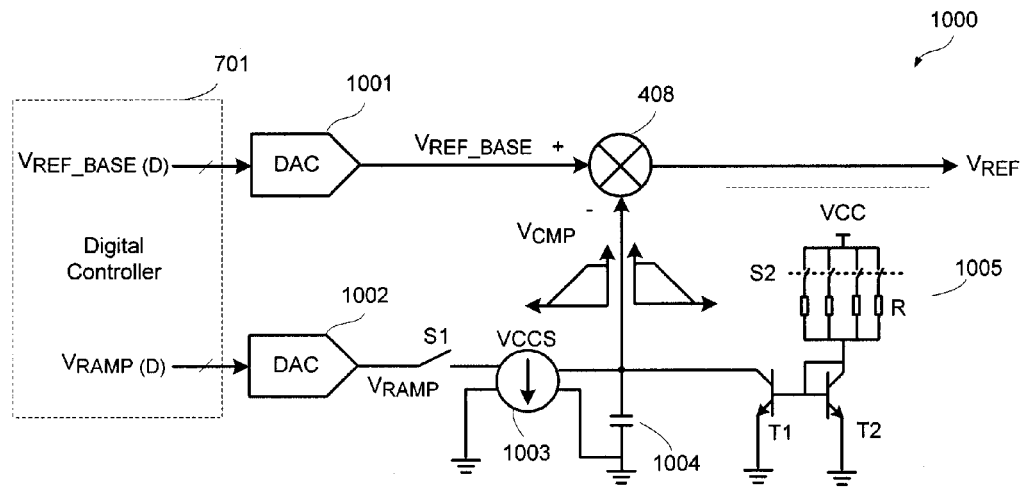
FIG. 10 schematically illustrates a diagram of circuit further comprising a charging circuit and a capacitor to provide a compensation signal shown in FIG. 4 in accordance with an embodiment of the present invention.

FIG. 10 schematically illustrates a diagram of circuit 1000 further comprising a charging circuit and a capacitor to provide a compensation signal shown in FIG. 4 in accordance with an embodiment of the present invention. As shown in FIG. 10, operating circuit 408 is coupled to a compensation signal $V_{CMP}$. An amplitude value of compensation signal $V_{CMP}$ is configured to be adjusted by a digital controller 701. In one embodiment, the charging circuit is configured to charge the capacitor to predetermined amplitude and the predetermined amplitude is adjusted by digital controller 701.

Circuit 1000 comprises a digital controller 701, a charging circuit, a capacitor and provides a reference signal $V_{REF}$ to comparison circuit 409 as shown in FIG. 4. Digital controller 701 provides a digital basic reference signal $V_{REF\_BASE\ (D)}$ and a digital amplitude signal $V_{RAMP\ (D)}$. Basic reference signal $V_{REF\_BASE}$ is converted from digital basic reference signal $V_{REF\_BASE\ (D)}$ by a DAC 1001. Digital amplitude signal $V_{RAMP\ (D)}$ indicates the amplitude voltage of compensation signal $V_{CMP}$. A DAC 1002 is used to convert digital amplitude signal $V_{RAMP\ (D)}$ to an amplitude signal $V_{RAMP}$. Operating circuit 408 receives compensation signal $V_{CMP}$, basic reference signal $V_{REF\_BASE}$, and provides reference signal $V_{REF}$ by subtracting compensation signal $V_{CMP}$ from basic reference signal $V_{REF\_BASE}$.

As shown in FIG. 10, a charging circuit and a capacitor 1004 are employed to provide compensation signal $V_{CMP}$. The charging circuit comprises a switch S1, a voltage controlled current source ("VCCS") 1003. Switch S1 is coupled to amplitude signal $V_{RAMP}$ which is adjusted by the digital controller. In one embodiment, switch S1 is configured to be controlled by digital controller 701. Current source 1003 is coupled to switch S1 and provides an output. The output of current source 1003 is proportional to amplitude signal $V_{RAMP}$ when switch S1 is turned ON. Capacitor 1004 is coupled to the output of current source 1003. The voltage across capacitor 1004 is compensation signal $V_{CMP}$. When switch S1 is turned ON, input of current source 1003 equals the voltage of amplitude signal $V_{RAMP}$, capacitor 1004 is charged by output current of current source 1003 which is proportional to the voltage of amplitude signal $V_{RAMP}$. As a result, a charging rate $K_{CHARGE}$ of capacitor C is related with the voltage of amplitude signal $V_{RAMP}$.

Circuit 1000 further comprises a discharging circuit 1005. Discharging circuit 1005 is configured to discharge capacitor 1004 with a predetermined discharging rate $K_{DISCHARGE}$. In one embodiment, predetermined discharging rate $K_{DISCHARGE}$ is adjusted by digital controller 701. In one embodiment, discharging circuit 1005 comprises a switch matrix comprising switches S2 and resistors R. Each switch and resistor are coupled in series as one switch string, and the switch strings are coupled in parallel with each other as the switch matrix. Switches S2 is optional to be turned on and then related resistor serial with corresponding switch is chosen accordingly. As a result, the discharging rate is related with the combination of switches S2 and resistors R2. One of ordinary skill in the art is noted to use resistors with appropriate resistance. The resistance of resistors R may be different from each other.

In one embodiment, switches S2 are controlled to be turned ON or OFF by digital controller 701. A voltage source VCC is coupled to one terminal of the switch matrix. A current mirror is coupled to another terminal of the switch matrix. The current mirror is composed by transistor T1 and transistor T2. The collector of transistor T2 is coupled to the switch matrix. The collector of transistor T2 is connected to the base of transistor T2 and the base of the transistor T1. The emitter of transistor T1 and the emitter of transistor T2 are both coupled to electrical ground. The collector of transistor T1 is coupled to the first terminal of capacitor C. When switch S1 is turned off, the discharging rate $K_{DISCHARGE}$ of capacitor C is determined by the switch matrix comprising switches S2 and resistors R2. Digital controller 701 is configured to turn ON corresponding switches S2, thus control the discharging rate $K_{DISCHARGE}$ of capacitor C.

Figure 11:
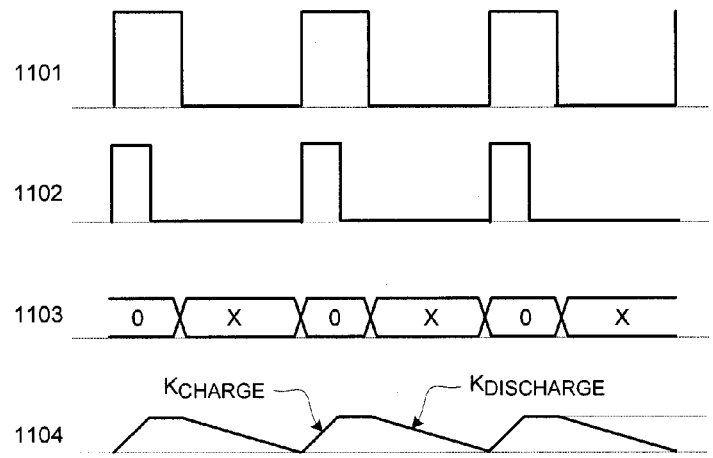
FIG. 11 shows waveforms illustrating signals of the circuit shown in FIG. 4 and FIG. 10 in accordance with embodiments of the present invention.

FIG. 11 shows example waveforms illustrating signals of the circuit shown in FIG. 4 and FIG. 10 in accordance with one embodiment of the present invention. The first waveform 1101 is the driving signal of switch 401. When waveform 1101 is logic HIGH, switch 401 is expected to be turned ON. The second waveform 1102 is one example of the driving signal of switch S1. When waveform 1102 is logic HIGH, switch S1 is expected to be turned ON. The third waveform 1103 indicates driving signals of switches S2. "X" means that there are some switches S2 turned ON, "0" means that all switches S2 are turned OFF. For example, when there are four switches S2, "X"="0110" means that a second and a third switches are turned ON, a first and a third switches are turned OFF. When switch S1 is turned ON, capacitor 1004 is charged at charging rate $K_{CHARGE}$. When some of switches S2 are turned ON, capacitor 1004 is discharged at discharging rate $K_{DISCHARGE}$. The last waveform 1104 shows compensation signal $V_{CMP}$. The amplitude of compensation signal $V_{CMP}$ is determined by amplitude signal $V_{RAMP}$.

Continuing with FIG. 4, FIG. 10 and FIG. 11. When feedback signal $V_{FB}$ is less than reference signal $V_{REF}$, driving signal 1101 of switch 401 and driving signal 1102 of switch S1 are set to HIGH, driving signals 1103 of switches S2 are set to LOW, and capacitor 1004 is charged by a current proportional to amplitude signal $V_{SLOPE}$. As a result, compensation signal $V_{CMP}$ is increased with charging rate $K_{CHARGE}$ until driving signal 1102 of switch S1 are set to LOW. The duration period that driving signal of switch S1 maintains HIGH may be determined by digital controller 701, for example, 300 ns. When switch S1 is turned OFF, compensation signal $V_{CMP}$ is maintained at its amplitude voltage before some switches S2 are turned ON. In one embodiment, some switches S2 are turned ON after switch 401 is turned OFF, capacitor 1004 is discharged and compensation signal $V_{CMP}$ is falling at discharging rate $K_{DISCHARGE}$. In other embodiments, some switches S2 are turned ON after a predetermined interval period when switch S1 is turned OFF. The predetermined interval period may be determined by digital controller 701, for example 100 ns.

Figure 12:
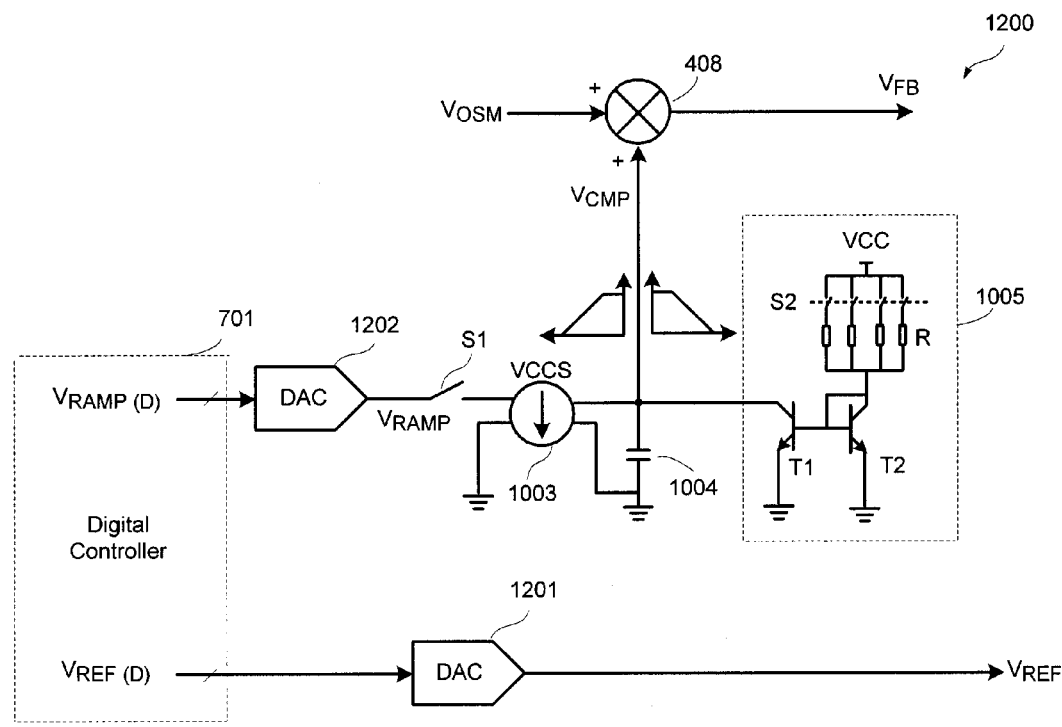
FIG. 12 schematically illustrates a diagram of circuit further comprising a charging circuit and a capacitor to provide a compensation signal shown in FIG. 5 in accordance with an embodiment of the present invention.

FIG. 12 schematically illustrates a diagram of circuit further comprising a charging circuit and a capacitor to provide a compensation signal shown in FIG. 5 by in accordance with an embodiment of the present invention. Circuit 1200 comprises a digital controller 701, and provides a feedback signal $V_{FB}$ to comparison circuit 409 as shown in FIG. 5.

Digital controller 701 comprises a digital reference signal $V_{REF\ (D)}$ and a digital amplitude signal $V_{SLOPE\ (D)}$. Reference signal $V_{REF}$ is converted from digital reference signal $V_{REF\ (D)}$ by a DAC 1201. Digital amplitude signal $V_{RAMP\ (D)}$ indicates an amplitude voltage of compensation signal $V_{CMP}$. A DAC 1202 is used to convert digital amplitude signal $V_{RAMP\,(D)}$ to an amplitude signal $V_{RAMP}$. Operating circuit 408 receives compensation signal $V_{CMP}$, sensed output voltage $V_{OSM}$, and provides feedback signal $V_{FB}$ by adding compensation signal $V_{CMP}$ to sensed output voltage $V_{OSM}$.

As shown in FIG. 12, a charging circuit and a capacitor are employed to provide compensation signal $V_{CMP}$. Compensation signal $V_{CMP}$ is provided the same as circuit 1000 shown in FIG. 10. Detailed description is not described for simplicity and clarity.

Figure 13:
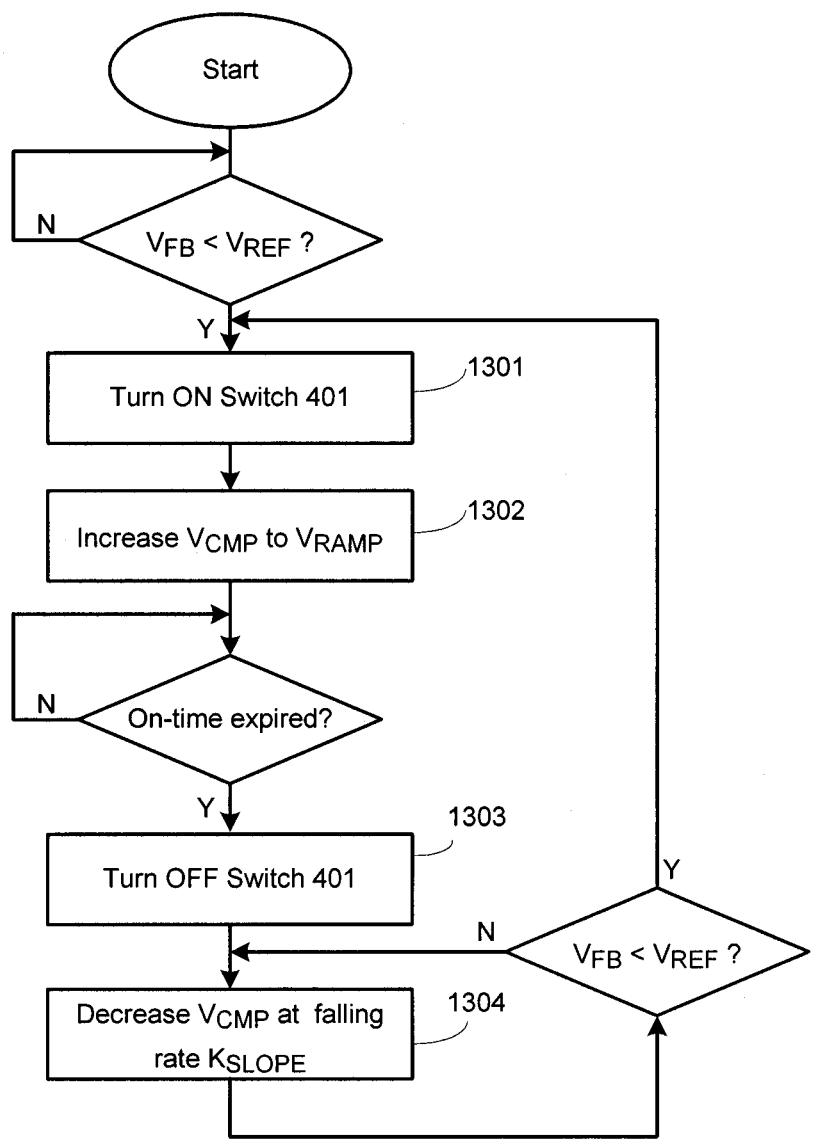
FIG. 13 shows a flow chart illustrating an improved constant on-time DC/DC converting method with stabilizing operation in accordance with an embodiment of the present invention.

FIG. 13 shows a flow chart illustrating an improved constant on-time DC/DC converting method with stabilizing operation in accordance with an embodiment of the present invention. First, sensing output voltage $V_O$ of the converter and providing a sensed output voltage $V_{OSM}$ which is used to generate a feedback signal $V_{FB}$. Second, providing a comparison signal by comparing feedback signal $V_{FB}$ with a reference signal $V_{REF}$. Third, providing an on-time signal with a constant time in accordance with the comparison signal. Fourth, driving switches of the converter in response to the comparison signal and the on-time signal. Fifth, providing a compensation signal $V_{CMP}$ which is adjusted by a digital controller, compensation signal $V_{CMP}$ is configured to be added to sensed output voltage $V_{OSM}$ as feedback signal $V_{FB}$ or compensation signal $V_{CMP}$ is configured to be subtracted from a basic reference signal $V_{REF\_BASE}$ as reference signal $V_{REF}$.

Taking step-down converter as shown in FIG. 4 for an example. At stage 1301, when feedback signal $V_{FB}$ is less than reference signal $V_{REF}$, high-side switch 401 is configured to be turned ON. And then at stage 1302, compensation signal $V_{CMP}$ is configured to be increased to a voltage of a predetermined amplitude signal $V_{RAMP}$. After arrived at the predetermined amplitude, compensation signal $V_{CMP}$ remains until a delay time Td period expired. In one embodiment, the delay time period Td is the on-time that high-side switch 401 maintained. At stage 1303, high-side switch 401 is turned OFF after the on-time expired. And then at stage 1304, compensation signal $V_{CMP}$ starts to decrease at a falling rate $K_{SLOPE}$. When feedback signal $V_{FB}$ is less than reference signal $V_{REF}$, next period is started.

Besides an intrinsic logic delay, there may be a delay between the stage 1301 and the stage 1302, i.e., there may be a delay between turning on high-side switch 401 and increasing compensation signal $V_{CMP}$. The delay may be controlled by the digital controller or by external circuits. The digital controller may comprise a digital compensation signal $V_{CMP\,(D)}$, and compensation signal $V_{CMP}$ is converted from digital compensation signal $V_{CMP\,(D)}$ through a digital-to-analog device. At stage 1302, digital compensation signal $V_{CMP}$ may jump to a predetermined digital amplitude signal directly. At stage 1304, compensation signal $V_{CMP}$ may decrease at non-linear falling rate. For example, compensation signal $V_{CMP}$ decreases at about 10V/ms at first and then about 40V/ms. Amplitude signal $V_{RAMP}$ and falling rate $K_{SLOPE}$ may be adjusted by the digital controller.

The above description and discussion about specific embodiments of the present technology are for purposes of illustration. However, one with ordinary skill in the relevant art should know that the invention is not limited by the specific examples disclosed herein. Variations and modifications can be made on the apparatus, methods and technical design described above. Accordingly, the invention should be viewed as limited solely by the scope and spirit of the appended claims.

We claim:

1. A converter, comprising:
an input terminal, coupled to an input voltage;
an output terminal, configured to provide an output voltage;
a feedback circuit configured to sense the output voltage of the converter and configured to provide a sensed output voltage, the sensed output voltage is configured to generate a feedback signal;
an operating circuit having a first input and a second input, and an output, wherein the first input of the operating circuit is coupled to receive a compensation signal adjusted by a digital controller, wherein the output of the operating circuit is configured to provide a compensated signal as the feedback signal or as a reference signal;
a comparison circuit having a first input and a second input, and an output, wherein the first input of the comparison circuit is coupled to the output of the operating circuit, and the comparison circuit is configured to provide a comparison signal at the output of the comparison circuit, the comparison signal is generated by comparing the feedback signal with the reference signal;
a timer, having an output configured to provide an on-time signal with a constant time;
a driving circuit having a first input and a second input, and having an output, wherein the first input of the driving circuit is coupled to the output of the comparison circuit and the second input of the driving circuit is coupled to the output of the timer; and
a switching circuit, coupled to the input terminal of the converter and the output of the driving circuit, the switching circuit is configured to be turned ON according to the output of the comparison circuit, and to be turned OFF according to a falling edge of the on-time signal, the switching circuit is configured to regulate the output voltage of the converter based on the input voltage of the converter and switching action of the switching circuit; and wherein
the compensation signal is configured to rise up to a predetermined amplitude when the feedback signal is less than the reference signal, and after the switching circuit is configured to be turned OFF, the compensation signal is configured to ramp down at a falling rate; and
the digital controller is configured to adjust the predetermined amplitude and the falling rate of the compensation signal.

2. The converter of claim 1, wherein the second input of the operating circuit is coupled to receive a basic reference signal, and wherein the output of the operating circuit is configured to provide the reference signal by subtracting the compensation signal from the basic reference signal.

3. The converter of claim 2, wherein the feedback signal comprises the sensed output voltage.

4. The converter of claim 2, further comprising a digital to analog converter (DAC) having an input and an output, wherein the input of the digital to analog converter is configured to receive a digital basic reference signal provided by the digital controller, wherein the output of the digital to analog converter is configured to provide the basic reference signal, and wherein the DAC is configured to convert the digital basic reference signal to the basic reference signal.

5. The converter of claim 1, wherein the second input of the operating circuit is coupled to receive the sensed output voltage, and wherein the output of the operating circuit is configured to provide the feedback signal by adding the compensation signal to the sensed output voltage.

6. The converter of claim 5, further comprising a DAC having an input and an output, wherein the input of the DAC is configured to receive a digital reference signal provided by the digital controller, wherein the output of the DAC is configured to provide the reference signal, and wherein the DAC is configured to convert the digital reference signal to the reference signal.

7. The converter of claim 1, further comprising a DAC having an input and an output, and wherein:
the compensation signal comprises a digital compensation signal;
the second input of the operating circuit is coupled to receive a digital basic reference signal;
the output of the operating circuit is configured to provide a digital reference signal by subtracting the compensation signal from the digital basic reference signal;
the input of the DAC is configured to receive the digital reference signal;
the output of the DAC is configured to provide the reference signal; and
the DAC is configured to convert the digital reference signal to the reference signal.

8. The converter of claim 1, further comprising a DAC having an input and an output, wherein the input of the DAC is configured to receive a digital compensation signal provided by the digital controller, wherein the output of the DAC is configured to provide the compensation signal, and wherein the DAC is configured to convert the digital compensation signal to the compensation signal.

9. The converter of claim 8, wherein the digital controller further comprises a predetermined amplitude signal, and wherein:
when the feedback signal is less than the reference signal, the digital compensation signal equals the predetermined amplitude signal; and then
after a delay time period expired, the digital compensation signal starts to decrease.

10. The converter of claim 1, further comprising a charging circuit, a discharging circuit and a capacitor, and wherein:
the charging circuit is configured to charge the capacitor to the predetermined amplitude, wherein the predetermined amplitude is adjusted by the digital controller;
the discharging circuit is configured to discharge the capacitor with a predetermined discharging rate, wherein the predetermined discharging rate is adjusted by the digital controller; and
the capacitor is coupled to the charging circuit, the discharging circuit and the operating circuit, wherein a voltage across the capacitor comprises the compensation signal.

11. A control circuit for constant on-time converter, comprising:
a feedback circuit, configured to sense an output voltage of the converter and configured to provide a sensed output voltage, the sensed output voltage is configured to generate a feedback signal;
an operating circuit, having a first input and a second input, and an output, wherein the first input of the operating circuit is coupled to receive a compensation signal, wherein an amplitude value of the compensation signal is configured to be adjusted by a digital controller, and wherein the output of the operating circuit is configured to provide a compensated signal as the feedback signal or as a reference signal;
a comparison circuit, having a first input and a second input, and an output, wherein the first input of the comparison circuit is coupled to the output of the operating circuit, and the comparison circuit is configured to provide a comparison signal at the output of the comparison circuit, the comparison signal is generated by comparing the feedback signal with the reference signal;
a timer, having an output configured to provide an on-time signal with a constant time; and
a driving circuit, having a first input and a second input, and having an output, wherein the first input of the driving circuit is coupled to the output of the comparison circuit and the second input of the driving circuit is coupled to the output of the timer, wherein the output of the driving circuit is set according to the output of the comparison circuit and the output of the driving circuit is reset according to the output of the timer; and wherein
the compensation signal is configured to rise up to a predetermined amplitude when the feedback signal is less than the reference signal, and after the switching circuit is configured to be turned OFF, the compensation signal is configured to ramp down at a falling rate; and
the digital controller is configured to adjust the predetermined amplitude and the falling rate of the compensation signal.

12. The control circuit of claim 11, wherein the control circuit further comprises:
a first switch, having a first terminal, a second terminal and a control terminal, wherein the first terminal of the first switch is coupled to receive an amplitude signal which is adjusted by the digital controller, and wherein the control terminal of the first switch is coupled to the digital controller;
a first current source, having an input and an output, wherein the input of the first current source is coupled to the second terminal of the first switch, and wherein the output of the first current source is configured to provide an output current in proportion to a voltage at the input of the first current source; and
a capacitor, coupled to the output of the first current source, wherein a voltage across the capacitor comprises the compensation signal.

13. The control circuit of claim 11, wherein the control circuit further comprises a switch matrix having switch strings, wherein each switch string comprises a switch and a resistor, the switch and the resistor is configured to be coupled in series, and the switch matrix is configured to discharge the compensation signal through the switch strings.

14. The control circuit of claim 13, wherein the switch in each switch string has a control terminal, wherein the control terminal of the switch is coupled to the digital controller.

15. The control circuit of claim 11, wherein the second input of the operating circuit is coupled to receive the sensed output voltage, and wherein the output of the operating circuit is configured to provide the feedback signal by adding the compensation signal to the sensed output voltage.

16. The control circuit of claim 11, wherein the second input of the operating circuit is coupled to receive a basic reference signal, and wherein the output of the operating circuit is configured to provide the reference signal by subtracting the compensation signal from the basic reference signal.

17. A method for controlling a power converter, comprising:
sensing an output signal of the converter and providing a sensed output voltage, the sensed output voltage is configured to generate a feedback signal;
providing a comparison signal by comparing the feedback signal with a reference signal;
providing an on-time signal with a constant time driving switches of the converter in response to the comparison signal and the on-time signal; and providing a compensation signal adjusted by a digital controller, wherein the compensation signal is configured to be added to the sensed output voltage as the feedback signal or the compensation signal is configured to be subtracted from a basic reference signal as the reference signal; and wherein the steps for generating the compensation signal comprising:
  when the feedback signal is less than the reference signal, the compensation signal is configured to increase to a predetermined amplitude; and
  then after a delay time period, the compensation signal starts to decrease at a falling rate.

18. The method of claim 17, wherein the predetermined amplitude and the falling rate are configured to be adjusted by the digital controller.

* * * * *